Figure 1:
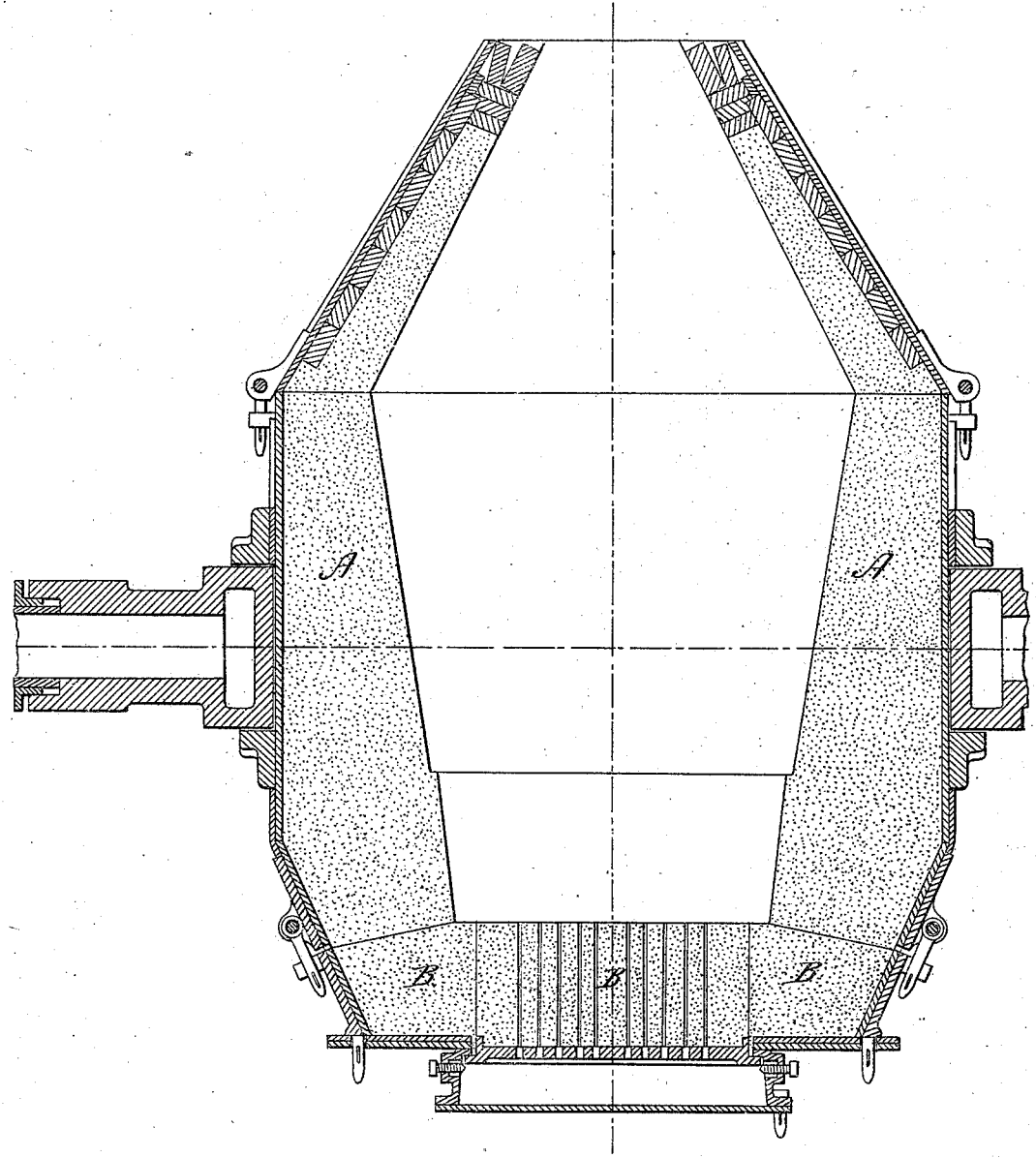

(No Model.) 6 Sheets—Sheet 1.

H. D. POCHIN.
MANUFACTURE OF REFRACTORY LININGS FOR BESSEMER CONVERTERS, &c.

No. 308,984. Patented Dec. 9, 1884.

(No Model.) 6 Sheets—Sheet 3.

H. D. POCHIN.
MANUFACTURE OF REFRACTORY LININGS FOR BESSEMER CONVERTERS, &c.

No. 308,984. Patented Dec. 9, 1884.

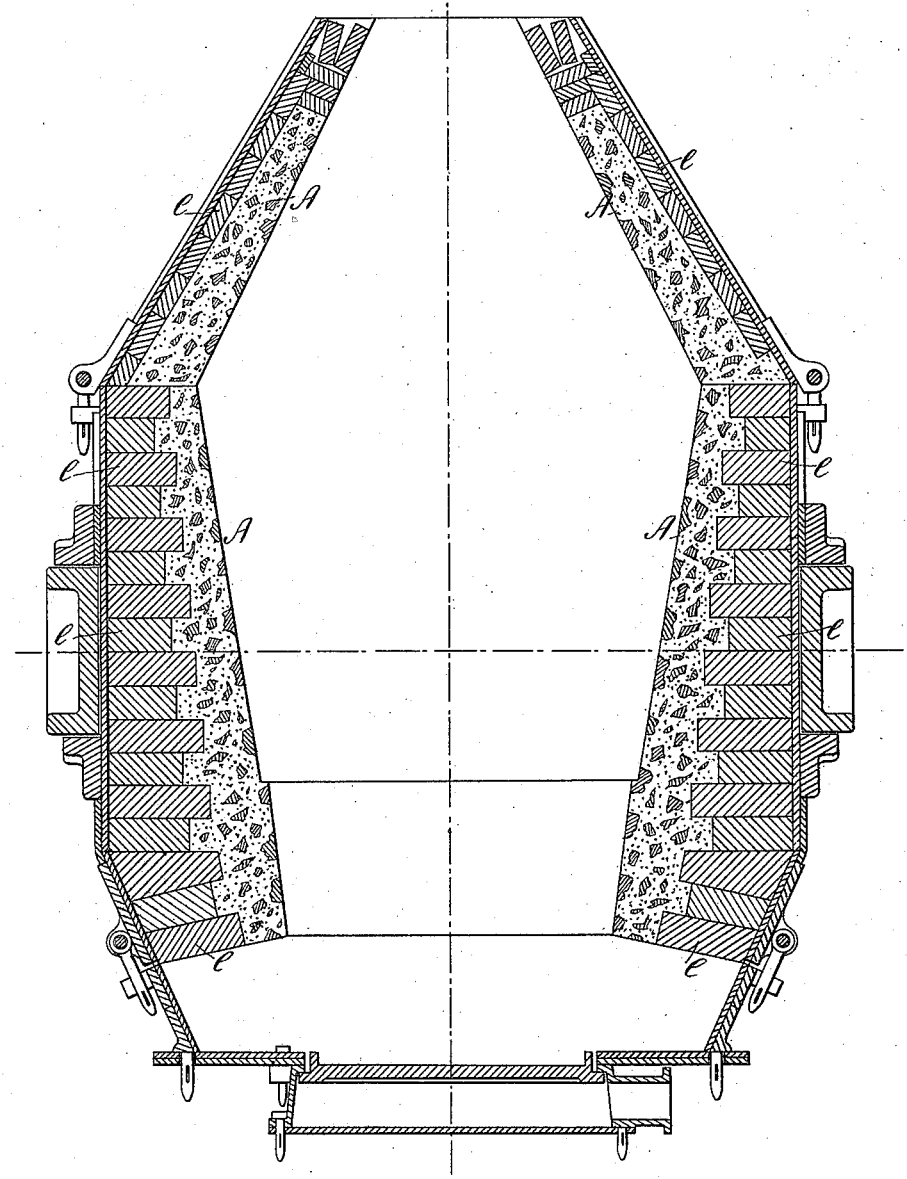

(No Model.)
H. D. POCHIN.
MANUFACTURE OF REFRACTORY LININGS FOR BESSEMER CONVERTERS, &c.
No. 308,984. Patented Dec. 9, 1884.
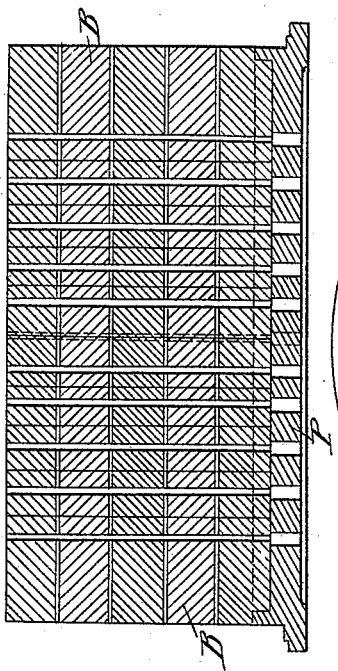
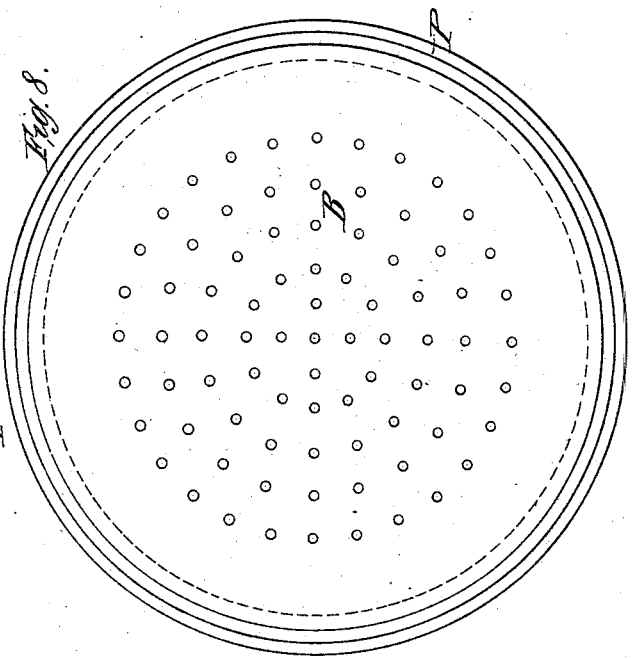
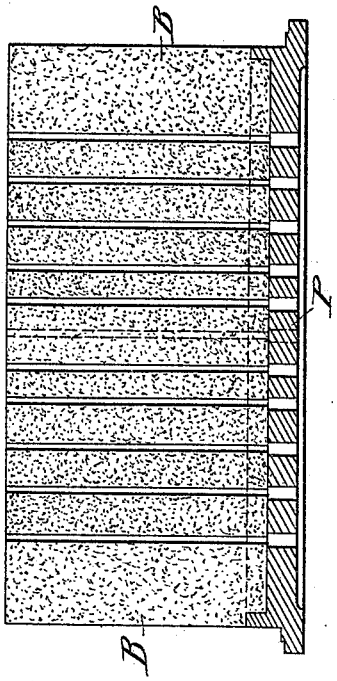
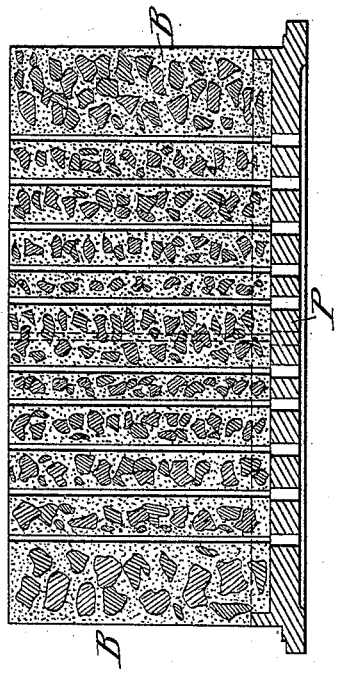

(No Model.)
H. D. POCHIN.
MANUFACTURE OF REFRACTORY LININGS FOR BESSEMER CONVERTERS, &c.
No. 308,984.  Patented Dec. 9, 1884.
6 Sheets—Sheet 6.
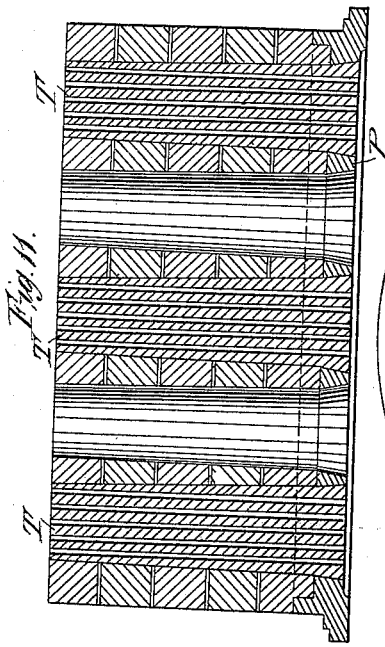
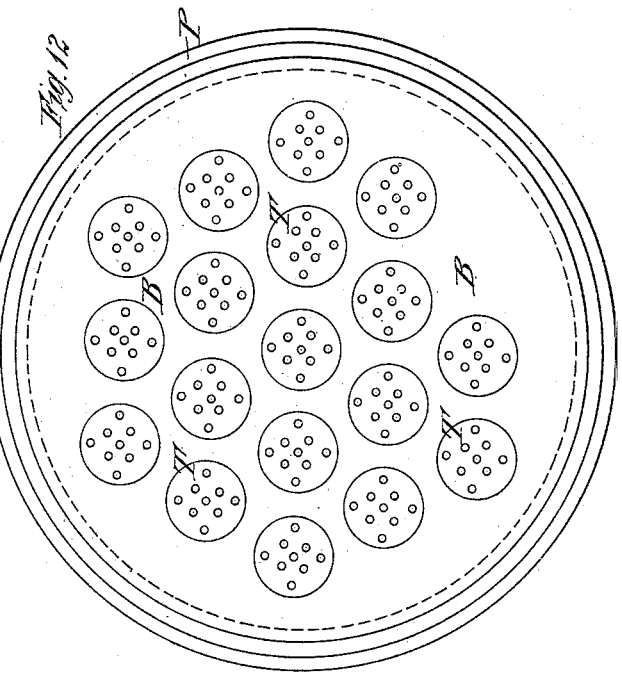
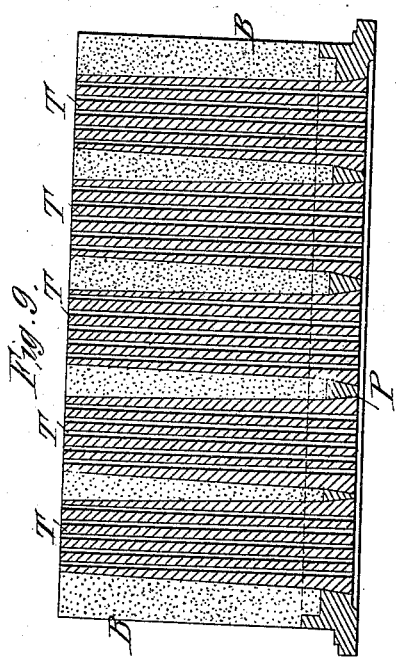
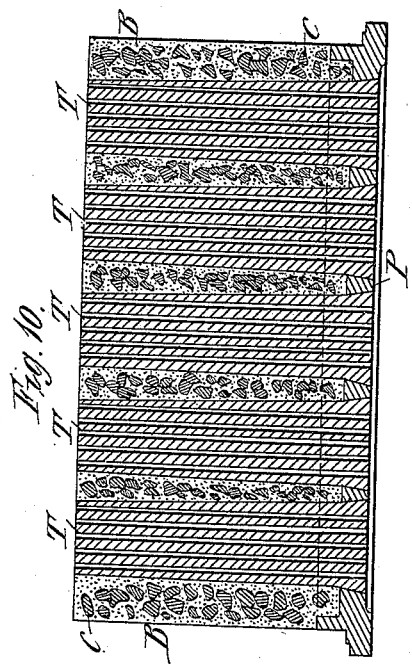
Witnesses:
J. H. Blackwood
L. A. Swartzell
Inventor:
Henry Davis Pochin
by W. H. Doolittle
Attorney

UNITED STATES PATENT OFFICE.

HENRY DAVIS POCHIN, OF BARNES, COUNTY OF SURREY, ENGLAND.

MANUFACTURE OF REFRACTORY LININGS FOR BESSEMER CONVERTERS, &c.

SPECIFICATION forming part of Letters Patent No. 308,984, dated December 9, 1884.

Application filed March 22, 1884. (No model.) Patented in England November 29, 1883, No. 5,768; in France March 8, 1884, No. 160,808; in Belgium March 8, 1884, No. 64,432, and in Austria August 29, 1884, No. 9,989.

*To all whom it may concern:*

Be it known that I, HENRY DAVIS POCHIN, a subject of the Queen of Great Britain and Ireland, residing at Barnes, in the county of Surrey, United Kingdom of Great Britain and Ireland, have invented certain new and useful improvements in the manufacture of the linings of furnaces, vessels, or passages, which are intended to bear intense heat, and more particularly in the lining of the converters used in the manufacture of Bessemer metal, and of other portions of the apparatus used in such manufacture; and I do hereby declare that the following is a full, clear, and exact description of the invention, which will enable others skilled in the art to which it appertains to make and use the same.

My invention has reference, chiefly, to the production of Bessemer metal, and when used in connection therewith has for its object to enable such metal to be produced more economically than has heretofore been practicable by providing the converter and apparatus connected therewith with a lining more durable than those hitherto employed.

Heretofore when making Bessemer metal by the basic process it has been usual to line the converter and apparatus connected therewith with a mixture of magnesian lime and tar, which lining is open to objection in practice, being expensive and subject to rapid deterioration. When making Bessemer metal from hematite pigs, the converter and apparatus connected therewith have been lined with fire-bricks, fire-clay, and ganister, which, however, only last for a very limited number of blows. Now, according to my invention, I use in the converter and apparatus connected therewith as a lining chromate of iron, otherwise known as "chrome-iron ore," whereby the Bessemer metal may be produced at considerably less cost.

In carrying out my invention it is desirable to select such chromate of iron (chrome-iron ore) as contains the smallest percentage of silica. The chromate of iron (chrome-iron ore) lining can be applied to any form of Bessemer converter or apparatus connected therewith, and is suitable for either the basic process or the acid process; but where intended for the basic process it is preferred to employ a converter of concentric form, as represented in the accompanying drawings.

The chrome ore may, according to my invention, be used in various ways, as hereinafter appears.

To apply my said invention I reduce chromate of iron (chrome-iron ore) to a pulverized state and mix it with suitable liquid—say water, or tar, or melted pitch, or crude petroleum—to such a consistency that the mixture will run freely and fill up interstices. Such a mixture will be hereinafter called "slurry." When forming this lining in the converter, a cast-iron mold is placed inside the converter at a suitable distance from its inner surface, so as to form a removable core, then the lining material (slurry) may be run into the space between the mold or core and the interior surface of the converter.

Figure 1 of the drawings represents in vertical section a Bessemer converter with a lining so constructed. A lining of like section to that represented in Fig. 1 may also be made according to my invention by ramming up chromate of iron (chrome-iron ore) in the same way as a ganister lining is now rammed up in the old Bessemer converter—that is to say, the chromate of iron (chrome-iron ore) is to be ground up by powerful machinery in the usual way of grinding up ore, then the ground product is to be damped with just sufficient liquid of a suitable kind—say water, or tar, or melted pitch, or crude petroleum—to cause the ground material to bind together on being pressed. A mold or core is placed, as before described, within the converter, and the damped material is stamped in tightly between the mold and the interior surface of the converter in the same way as molders stamp sand around a pattern. B shows the lining of the bottom of the converter, to which I shall presently refer more fully.

Figure 2:
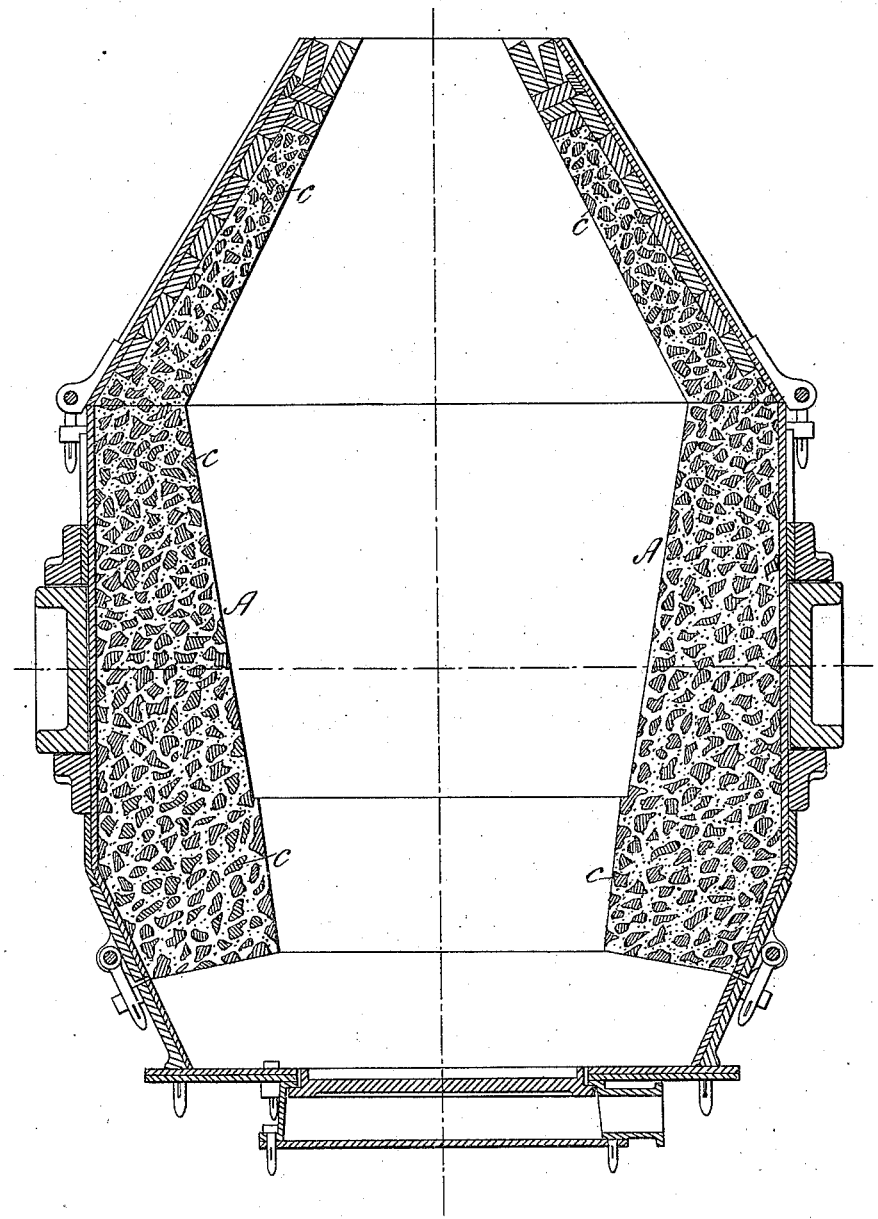

Fig. 2 is a vertical section of a Bessemer converter in which the lining is made by using lumps c of chromate of iron (chrome-iron ore) in conjunction with slurry of the kind described with reference to Fig. 1.

Figure 3:
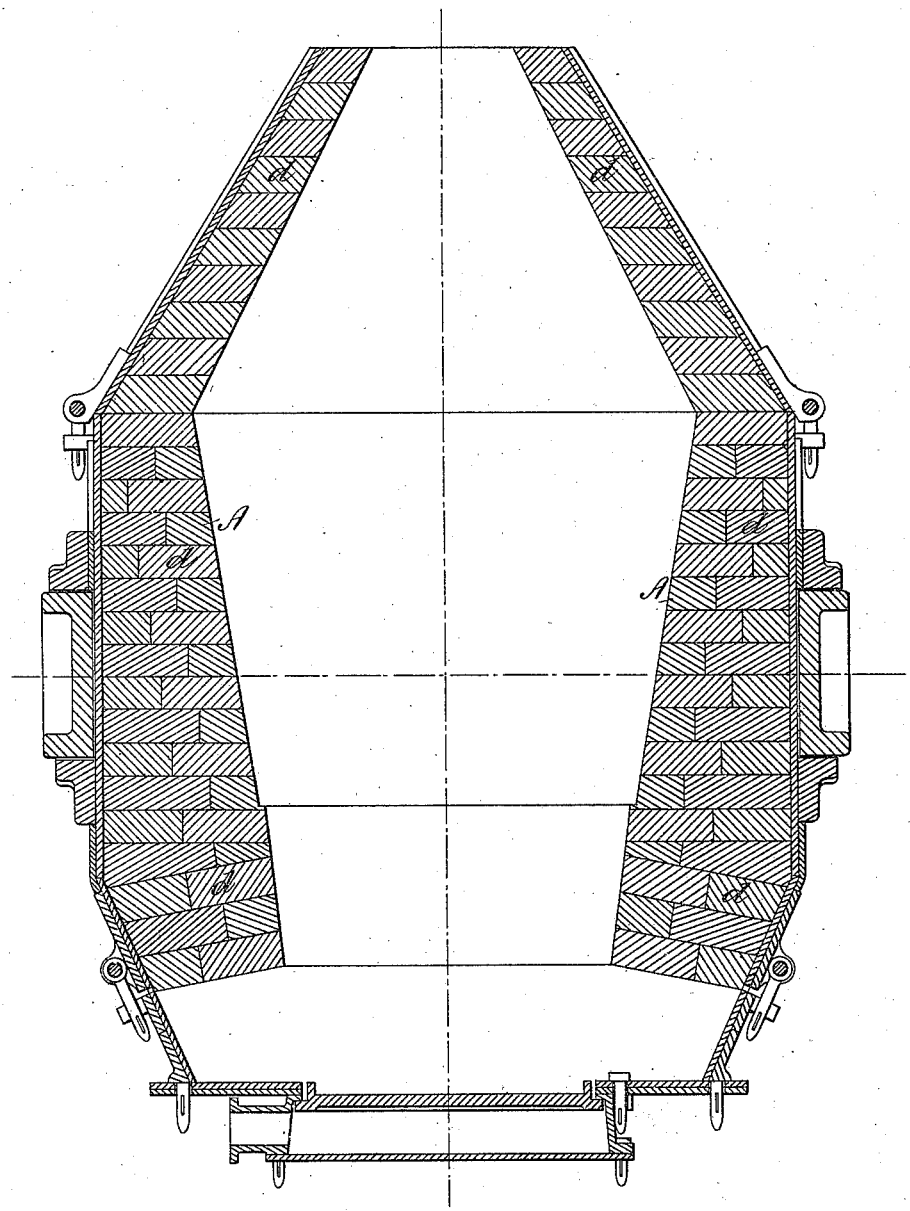

In the arrangement illustrated in Fig. 3 ground-up chromate of iron (chrome-iron ore)

with suitable binding material—such as tar, melted pitch, or crude petroleum—is molded into bricks $d$ of suitable form to conform to the shape of the converter. These bricks are dried in an ordinary stove and then built up inside the converter, as shown, slurry being used to bind them together.

Fig. 4 represents a converter wherein the lining is made as follows: $e\,e$ are bricks forming the lining nearest to the converter-shell, and which bricks may be of ordinary material—such as ganister or fire-clay—and A is an inner lining consisting of a layer of chromate of iron (chrome-iron ore) rammed in between the lining-bricks $e$ and a mold or core temporarily inserted within the converter, as before referred to. The inner lining, A, may be entirely of slurry, or may consist of slurry in conjunction with lumps $c$ of chromate of iron, (chrome-iron ore,) as described with reference to the lining represented in Fig. 2; or the inner lining, A, may be made by ramming damped pulverized chromate of iron (chrome-iron ore) to the required form; or it may be of bricks such as described with reference to Fig. 3. By the just-described formation of compound lining an economy is obtained in the use of the more expensive and denser material, it being desirable not to make the converter with its lining heavier than is absolutely necessary. So far I have particularly described the lining of the walls of the converters. Now it is of great importance that the linings of the "bottoms" of the converters should be carefully and properly constructed. In the drawings are illustrated ways of making those portions of them which are called the "plugs."

Figs. 5, 6, 7, and 8 show several ways of using chromate of iron (chrome-iron ore) in what are called "pin" bottoms. In making these bottoms pins (of a diameter of about three-fourths of an inch) are placed in the cast-iron bottom plate, P, so as to project above its upper surface, after which the lining material B is put in in either of the several ways shown—that is to say, it may be in the form of slurry or of damped pulverized chromate of iron, (chrome-iron ore,) suitably rammed, Fig. 5, or in the form of slurry and lumps, Fig. 6, or in the form of bricks, Fig. 7. When the lining has "set," the pins are withdrawn.

Figs. 9, 10, 11, and 12 illustrate arrangements having tuyeres T made of chromate of iron, (chrome-iron ore,) which are first dried in a similar manner to that practiced in making bricks, and are then placed in position in the bottom plate, P, after which the lining material B is put around them in either of the several ways shown and just above described with reference to Figs. 5, 6, and 7, respectively.

In the above description I have dealt only with the case of Bessemer converters; but it is obvious that in a similar way linings of furnaces, vessels, and passages intended to bear intense heat can be constructed; but it is not necessary for me to give any further description of the manner in which my invention is to be applied in such cases, as the foregoing description will render it clear and evident.

Having fully described my invention, what I desire to claim, and secure by Letters Patent, is—

1. In the manufacture of Bessemer metal, the method of protecting the shell of the converter and apparatus connected therewith, which consists in the interposition between the metal under treatment and the shell of the converter or apparatus of a covering or lining composed of or containing chromate of iron, (chrome-iron ore,) substantially as described.

2. A converter or apparatus for the manufacture of Bessemer metal, constructed with a lining composed of or containing chromate of iron, (chrome-iron ore,) substantially as described.

3. A converter or apparatus for the manufacture of Bessemer metal, constructed with a compound lining composed of an outer layer of bricks of ganister, fire-clay, or the like, and an inner layer composed of or containing chromate of iron, (chrome-iron ore,) substantially as described.

4. As a new article of manufacture, a highly-resistant lining for furnaces, vessels, and passages intended to bear intense heat, consisting of or containing chromate of iron, (chrome-iron ore,) substantially as described.

HENRY DAVIS POCHIN.

Witnesses:
F. J. BROUGHAM,
46 *Lincoln's Inn Fields, London, W. C.*
EDWD. N. HOBBS,
2 *Pope's Head Alley, Cornhill, London, E. C.*